(12) United States Patent
Markman et al.

(10) Patent No.: US 7,194,026 B2
(45) Date of Patent: Mar. 20, 2007

(54) BLIND EQUALIZATION METHOD FOR A HIGH DEFINITION TELEVISION SIGNAL

(75) Inventors: Ivonete Markman, Carmel, IN (US); John Sydney Stewart, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 956 days.

(21) Appl. No.: 10/103,641

(22) Filed: Mar. 20, 2002

(65) Prior Publication Data

US 2003/0012274 A1 Jan. 16, 2003

Related U.S. Application Data

(60) Provisional application No. 60/286,728, filed on Apr. 26, 2001.

(51) Int. Cl.
*H04H 7/30* (2006.01)
*H03D 1/24* (2006.01)
*H04N 5/44* (2006.01)

(52) U.S. Cl. .................. 375/233; 375/321; 348/726

(58) Field of Classification Search ............... 375/316, 375/270, 277, 320, 321, 229–235, 350; 332/357, 332/347; 348/725, 726, 608, 610, FOR. 146; 329/357; 455/37
See application file for complete search history.

(56) References Cited

U.S. PATENT DOCUMENTS

| | | | | |
|---|---|---|---|---|
| 4,186,384 A | * | 1/1980 | Acker | 341/143 |
| 4,309,770 A | * | 1/1982 | Godard | 375/232 |
| 6,222,879 B1 | * | 4/2001 | Cideciyan et al. | 375/233 |
| 6,366,613 B2 | * | 4/2002 | Sommer et al. | 375/232 |
| 6,559,894 B2 | * | 5/2003 | Omura et al. | 348/614 |
| 2001/0043651 A1 | * | 11/2001 | Nishimura et al. | 375/232 |
| 2003/0108097 A1 | * | 6/2003 | Lee et al. | 375/232 |

* cited by examiner

*Primary Examiner*—Tesfaldet Bocure
(74) *Attorney, Agent, or Firm*—Joseph J. Laks; Ronald H. Kurdyla

(57) ABSTRACT

An adaptive equalizer updates its tap coefficients with the aid of an error signal $e(k)=\text{sign}[z(k)]*(R_S-|z(k)|^2)$ where sign[ ] is the sign function, $z(k)$ is the equalizer output at symbol time k, | | is the magnitude function and $R_S$ is a positive real constant, which is optimally defined as $R_S=E\{|a_n|^3\}/E\{|a_n|\}$, where $E\{\ \}$ is the mathematical expectation function and $a_n$ is the information symbol at symbol time n. A generalized equalizer error signal satisfies $e(k)=\text{sign}[z(k)]*(R_{Sp}-|z(k)|^p)$ where $R_{Sp}$ is a positive real constant, which is optimally defined as $R_{Sp}=E\{|a_n|^{p+1}\}/E\{|a_n|\}$ and p is a positive integer. The equalizer conducts blind equalization of an Advanced Television Systems Committee-High Definition Television signal and any other one-dimensional modulation system.

12 Claims, 4 Drawing Sheets

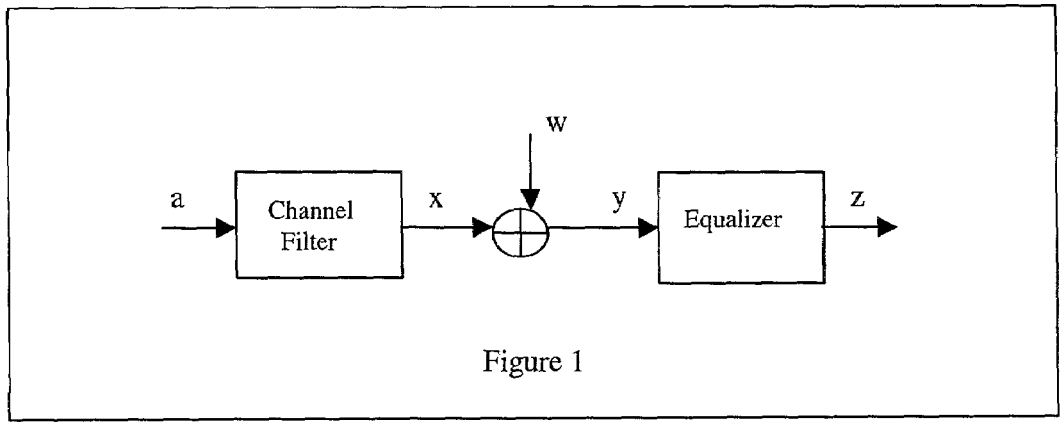
Figure 1
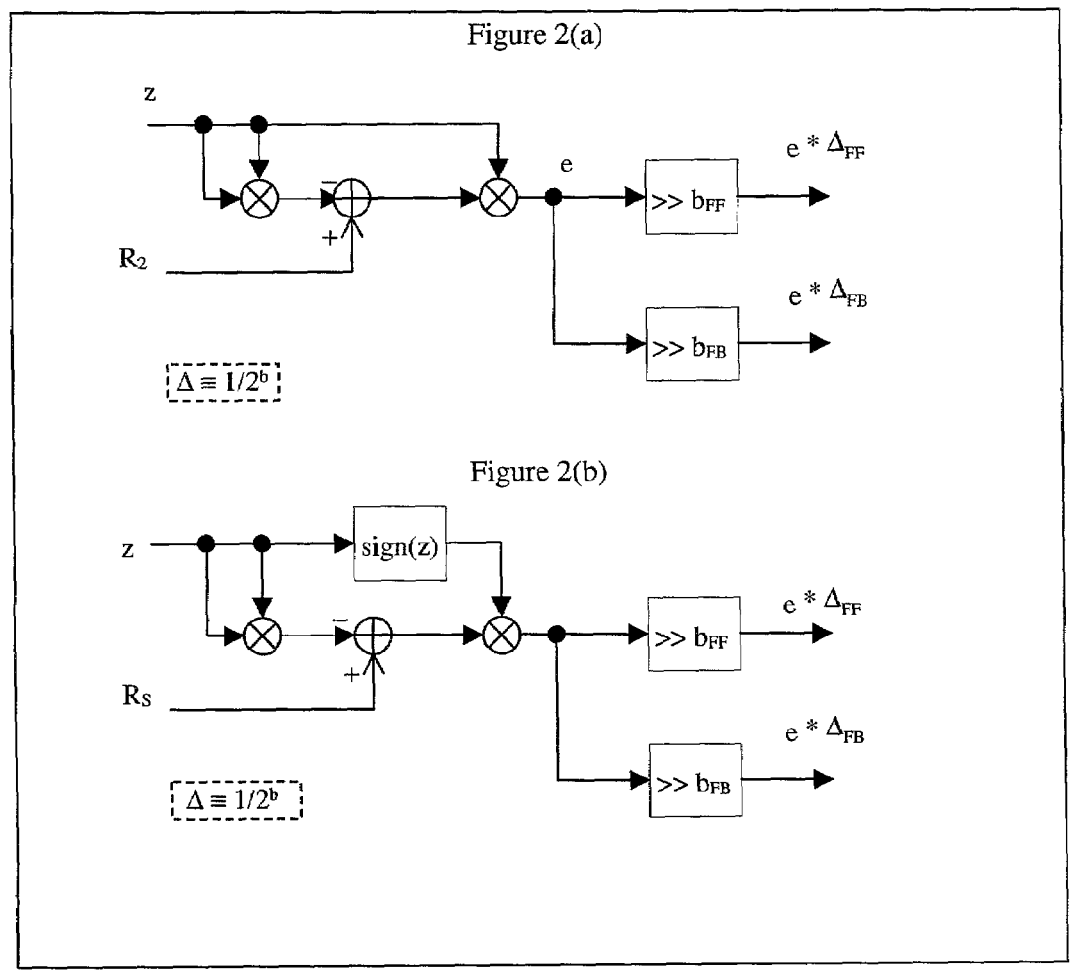
Figure 2(a)
Figure 2(b)

BLIND EQUALIZATION METHOD FOR A HIGH DEFINITION TELEVISION SIGNAL

CROSS REFERENCE TO RELATED APPLICATIONS

This is a regular utility patent application which claims priority to U. S. provisional patent application Ser. No. 60/286,728, filed Apr. 26, 2001 and assigned to the same assignee as this application.

FIELD OF THE INVENTION

This invention relates to the field of digital communications, specifically in the area of channel equalization. It is disclosed in the context of a receiver for High-Definition Television (HDTV), for example a receiver operating according to the Advanced Television Systems Committee (ATSC) Vestigial Sideband (VSB) standard, but is believed to be useful in other applications as well.

BACKGROUND OF THE INVENTION

In the field of digital communications (i.e., transmission and reception), various methods and apparatus are known for the reliable recovery of symbol streams from received signals, depending on the particular transmission system and channel. Generally, such methods and apparatus operate by: (a) analog processing the signal by an input network including RF tuning circuits and an intermediate frequency (IF) processor; (b) analog-to-digital converting the analog processed signal into a sequence of digital samples; (c) demodulating the received digital sequence into a baseband un-equalized symbol stream; (d) equalizing the symbol stream in such a way that the symbols can reliably be mapped to particular points in a so-called symbol constellation. The equalized symbols are then decoded into bit groups, for example, bit pairs, quartets, sextets, octets, and so on, depending upon the complexity of the constellation. Equalization is necessary when the transmission channel and system introduce linear distortions in the signal, resulting in intersymbol interference (ISI), like for example, multipath propagation in the terrestrial broadcast channel; and (e) further data processing which may include Forward Error Correction (FEC) decoding and deinterleaving, among others.

In such methods and apparatus, the equalization process itself is typically adaptive. That is, the un-equalized symbol stream is input to a device or system which monitors its output symbol stream, and adapts its own transfer function to fit the points of its output symbol stream as closely as possible to points of the symbol constellation. Equalization is frequently conducted with the aid of a so-called Decision Feedback Equalizer (DFE), consisting of a Feed Forward Filter and a Feed Back Filter (FFF and FBF, respectively). See John G. Proakis, "Digital Communications", McGraw-Hill, $2^{nd}$ Edition, 1989, New York. In many circumstances, the adaptive equalization process is conducted in at least two phases, or operating modes: (a) initialization or convergence phase; and (b) tracking phase. In the initialization or convergence phase, conducted at startup of the equipment, or for example, when an HDTV receiver is tuned to another channel, among other situations, the equalizer employs one or more algorithms, which can be training-based (which use a training sequence as a reference) or blind (without the use of a training sequence). In the initialization phase, the equalizer attempts to reliably initially converge its output symbol stream within an arbitrarily close range of the points on the symbol constellation. An example of a blind convergence algorithm is Godard's Constant Modulus Algorithm (CMA). See D. N. Godard, "Self-Recovering Equalization and Carrier Tracking in Two Dimensional Data Communication Systems", IEEE Transactions on Communications, Vol. COM-28, pp.1867–1875, November 1980. See also D. N. Godard, U.S. Pat. No. 4,309,770. After initial convergence, the equalization process enters the tracking phase, in which the equalizer transfer function is continuously adapted using an algorithm such as a decision-directed algorithm to keep the decoded symbols within some arbitrarily close range of the points on the symbol constellation. Methods and apparatus of these types are well-known.

SUMMARY OF THE INVENTION

In accordance with the principles of the present invention, an adaptive equalizer updates its tap coefficients with the aid of an error signal $$e(k)=\text{sign}[z(k)]*(R_S-|z(k)|^2)$$

where sign[ ] is the sign function, z(k) is the equalizer output at symbol time k, | | is the magnitude function and $R_S$ is a positive real constant. According to one aspect of the present invention, $R_S$ is given by $$R_S=E\{|a_n|^3\}/E\{|a_n|\}$$

where E{ } is the mathematical expectation function and $a_n$ is the information symbol at symbol time n.

According to another aspect of the present invention, a generalized equalizer error signal satisfies $$e(k)=\text{sign}[z(k)]*(R_{Sp}-|z(k)|^p)$$

where $R_{Sp}$ is a positive real constant. According to yet another aspect of the invention, $R_{Sp}$ is given by $$R_{Sp}=E\{|a_n|^{(p+1)}\}/E\{|a_n|\}$$

and p is a positive integer.

BRIEF DESCRIPTION OF THE DRAWINGS

The invention may best be understood by referring to the following detailed description and accompanying drawings which illustrate the invention. In the drawings:

FIG. 1 illustrates a block diagram of an equalizer simulation;

FIG. 2a illustrates a block diagram of an equalizer blind error and step size generator implementing Godard's Constant Modulus Algorithm;

FIG. 2b illustrates a block diagram of an equalizer blind error and step size generator implementing an algorithm according to the present invention;

DETAILED DESCRIPTIONS OF ILLUSTRATIVE EMBODIMENTS

Figure 3:
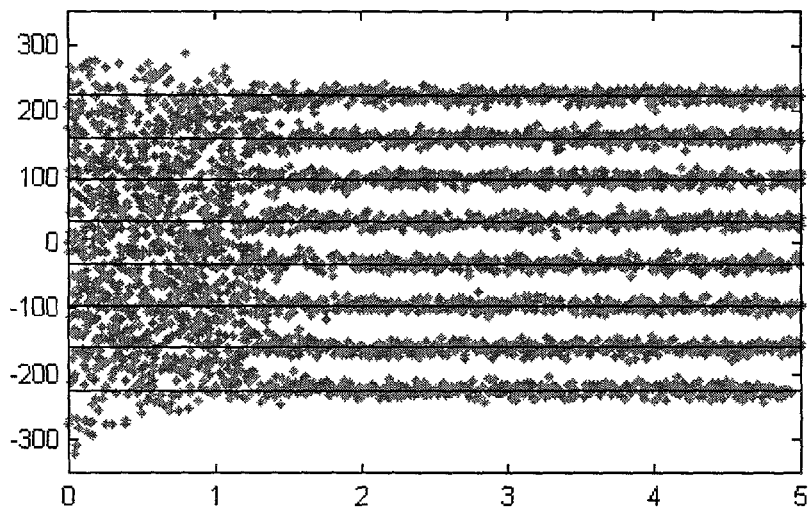
FIG. 3 illustrates equalizer and slicer outputs versus symbols on a $10^5$ scale for an algorithm according to the present invention operating in blind mode, with $R_S$=31744.

In the ATSC standard for HDTV in the U.S., the equalizer is an adaptive filter which receives a VSB data stream at an average rate equal to the symbol rate of approximately 10.76 MHz and attempts to remove linear distortions mainly caused by multipath propagation, which is characteristic of a terrestrial broadcast channel. (See United States Advanced Television Systems Committee, "ATSC Digital Television Standard", Sep. 16, 1995.) In the ATSC standard, a training sequence is included in the field sync to promote initial equalizer convergence. However, use of the training sequence requires prior correct detection of the field sync. Furthermore, the field sync only occurs approximately every 25 ms, which may slow the convergence process.

For ghost environments which make detection of field sync more difficult, or with a dynamic component, it is of interest to have an initial adjustment of the equalizer tap coefficients independent of a training sequence, that is, self-recovering or "blind." See, John G. Proakis, "Digital Communications", McGraw-Hill, 2nd edition, 1989, New York. In addition, because it operates on every data symbol, the blind algorithm will converge faster. One of the most commonly used algorithms for blind mode equalization, CMA, was devised by D. N. Godard, U.S. Pat. No. 4,309,770 and "Self-Recovering Equalization and Carrier Tracking in Two Dimensional Data Communication Systems", IEEE Transaction on Communications, Vol. COM-28, pp.1867–1875, November 1980. CMA contemplates the minimization of a class of non-convex cost functions, which are shown to characterize intersymbol interference independently of carrier phase and of the data symbol constellation used in the transmission system.

For a general adaptive equalizer including an equalizer filter with M memory elements, the tap coefficient update equation is $$c(n, k+1) = c(n, k) + (\Delta * e(k) * y(k - n)) \quad (1)$$
$$1 \leq n \leq M$$

where $c(n, k)$ is tap coefficient number n at symbol time k; $\Delta$ is the step size; $y(k-n)$ is the equalizer filter input at time $(k-n)$; and $e(k)$ is the error signal at symbol time k. In equation (1) and in subsequent analysis, symbol time k implies an actual time of k*T, where T is the symbol period and 1/T is the symbol rate.

Although Godard's CMA is general for cost functions of order p, practical implementations are generally restricted to the lowest orders. For a cost function of order 2, the blind mode error signal is $$e(k)=z(k)*(R_2-|z(k)|^2) \quad (2)$$

where $z(k)$ is the equalizer output at symbol time k, $|\ |^2$ is the square of the magnitude function and $R_2$ is the Godard radius or blind power ring of order 2. The power ring $R_2$ is defined as $$R_2=E\{|a(k)|^4\}/E\{|a(k)|^2\} \quad (3)$$

where $E\{\ \}$ is the mathematical expectation function, $|\ |$ is the magnitude function, and $a(k)$ is the information symbol (channel input) at symbol time k. The known power ring expression results from the error computation formula and can be thought of as an average against which every data symbol is compared to generate an error indication. This error is used to update the equalizer taps in the blind mode. The equalizer converges when this error is minimized.

From equation (2), it can be seen that, even though the error reflects a low order cost function, product terms of $3^{rd}$ order appear for the equalizer output $z(k)$. For an equalizer output with a 10-bit representation, this implies the need for 10-bit×10-bit×10-bit multipliers and a blind error with 30-bit representation. The blind error is then applied to the tap coefficient adaptation block described in equation (1), where it is utilized in additional product terms. It is therefore of interest to decrease the representation size of the blind error.

This invention proposes a new blind equalization algorithm for the ATSC-HDTV standard, which represents a simplification on the known Godard's CMA blind algorithm and can be applied to equalization of any one-dimensional modulation system. The invention presents a simplification of the blind error, which decreases its dynamic range and implies a new blind mode power ring. The new blind error requires a smaller number of bits to represent it, resulting in hardware savings in the equalizer implementation at the expense of a small increase in Mean Square Error (MSE) at the equalizer output. However, the impact of the slight increase in MSE at the equalizer output is lessened by the following: (a) after initial convergence, the blind mode algorithm transitions to a decision-directed algorithm, which further decreases the MSE; and (b) for the HDTV system, practical Signal-to-Noise Ratio (SNR) values are around 15 to 25 dB. Therefore, system white noise power is well above the MSE levels and ultimately dominates the equalizer performance.

The proposed simplified blind algorithm still satisfies the tap coefficient adaptation in equation (1), and has a blind error signal defined as $$e(k)=\text{sign}[z(k)]*(R_S-|z(k)|^2) \quad (4)$$

where $z(k)$ is the equalizer output at symbol time k, $|\ |^2$ is the squared magnitude function, $R_S$ is the new blind power ring and sign[ ] is the sign function that identifies the sign of a number and disregards its value. The sign function is defined as $$\text{sign}[x]=1, \text{ if } x \geq 0$$
$$-1, \text{ if } x<0 \quad (5)$$

The new blind power ring value associated with the simplified blind mode algorithm described by equations (1) and (4) is derived as follows. Some restrictions are made, based upon assumptions associated with the equalizer. The equalizer is assumed to be a real (non-complex)-valued baseband equalizer. It is assumed that the carrier tracking loop perfectly tracks the carrier, except for some amount of phase noise. The equalizer can correct a small amount of phase noise in decision-directed mode, due to the presence of the slicer, and actually passes it to the next step in the demodulation process, the phase tracker. However, the equalizer cannot correct for the phase noise during blind equalization. Phase noise is a zero mean process with a non-additive effect on the data. The effect perceived by the equalizer is of added noise. For simplicity, phase noise will be ignored, assuming the noise does not cause large enough variations of the signal phase to cause a change of sign in the input symbol. Therefore, the system is perfectly equalized when (a) the expected value of the tap coefficient increments is zero, and (b) the equalizer output matches the channel input.

From equations (1) and (4), item (a) above implies that $$E\{y_{k-n}*\mathrm{sign}(z_n)*(R_S-|z_n|^2)\}=0 \tag{6}$$

where $E\{\ \}$ is the mathematical expectation function, sign( ) is the sign function in equation (5), $y_{k-n}$ is $y(k-n)$ and $z_n$ is $z(n)$.

Equation (6) results in the expression for the blind power ring, given by $$R_S=E\{y_{k-n}*\mathrm{sign}(z_n)*|z_n|^2\}/E\{y_{k-n}*\mathrm{sign}(z_n)\} \tag{7}$$

In order to derive $R_S$, each term in equation (7) needs to be derived as a function of the information symbols "a". For a channel filter with equivalent baseband impulse response $\{h_m, m=0, 1, \ldots, M\}$, the channel output $y_n$ after carrier recovery is expressed as $$y_n=\Sigma_k a_k*h_{n-k}+w_n \tag{8}$$

where $w_n$ are filtered zero mean Gaussian noise variables.

According to item (b) above, the equalizer output at perfect equalization is given by $$z_n=a_n \tag{9}$$

In order to calculate the blind power ring, equations (8) and (9) can be substituted into the two terms of equation (7). The denominator term in equation (7) becomes $$E\{y_{k-n}*\mathrm{sign}(z_n)\}=E\{\Sigma_k a_k*h_{n-k}*\mathrm{sign}(a_n)\}+E\{w_n*\mathrm{sign}(a_n)\}=E\{|a_n|\}*h_0 \tag{10}$$

where the noise $w_n$ is assumed uncorrelated with the data and has zero mean, and the data $a_n$ is assumed to be uncorrelated in time.

Similarly, the numerator term in equation (7) becomes $$E\{y_{k-n}*z_n*|z_n|^2\}= \tag{11}$$

$$E\left\{\sum_k a_k*h_{n-k}*\mathrm{sign}(a_n)*|a_n|^2\right\}+E\{w_n*\mathrm{sign}(a_n)*|a_n|^2\}=$$

$$E\{|a_n|^3\}*h_0$$

Hence, from equations (7), (10) and (11)

$$R_S=(E\{|a_n|^3\}h_0)/(E\{|a_n|\}h_0)$$

or $$R_S=E\{|a_n|^3\}/E\{|a_n|\} \tag{12}$$

where $E\{\ \}$ is the mathematical expectation function, $|\ |$ is the magnitude function and $a(k)$ is the information symbol (channel input) at symbol time k. It is noted that the blind power ring of equation (12) is not the same as Godard's in equation (3). Also note that the use of the sign function in equation (4) decreases the complexity of the blind mode error to the $2^{nd}$ power of the equalizer output signal, implying a decrease in its dynamic range and in the number of bits required to represent it. This results in hardware savings in the equalizer implementation. For an equalizer output with a 10-bit representation, this implies a 20-bit representation of the blind error, which is a 33% decrease in size with respect to Godard's CMA.

In addition, this invention proposes a generalization of equation (4), to the form $$e(k)=\mathrm{sign}[z(k)]*(R_{Sp}-|z(k)|^p p) \tag{13}$$

where $z(k)$ is the equalizer output at symbol time k, $|\ |^2$ is the squared magnitude function, sign[ ] is the sign function, p is a positive integer and $R_{Sp}$ is the generalized blind power ring.

The expression for $R_{Sp}$ is a generalization of equation (12) and can be derived following similar steps to equations (6)–(12), being given by $$R_{Sp}=E\{|a_n|^{(p+1)}\}/E\{|a_n|\} \tag{14}$$

where $E\{\ \}$ is the mathematical expectation function, $|\ |$ is the magnitude function and $a(k)$ is the information symbol (channel input) at symbol time k.

In order to evaluate the proposed blind algorithm, simulations were performed in C programming language. The general simulation system is illustrated in FIG. 1. In the system, "a" corresponds to the transmitted VSB symbols, the channel filter is a Finite Impulse Response (FIR) type filter, "x" is the channel filter output, "w" is the zero mean additive Gaussian noise which may be colored (non-white) due to filtering in the receiver, but is uncorrelated with the data. The symbol "y" is the received symbol at the equalizer input, and "z" is the equalizer output, which attempts to replicate "a". In this example, a channel filter with a single 6 dB ghost at approximately 2 μs was chosen, which translates into an FIR filter with non-zero coefficients h[0]=1.0 and h[22]=0.5, and a DFE equalizer is employed. The step size chosen for the equalizer adaptation in equation (1) is the same for both FFF and FBF filter coefficients and, unless otherwise specified, no noise is added.

Simulations were performed in floating point, except for the error generation and step size, which were implemented in fixed point and converted to floating point. The idea is to consider only the implementation loss resulting from the error block, which influences the MSE at the equalizer output, since this is the block of interest. FIG. 2 illustrates the block diagram implementations in equations (2) and (4), followed by the step size implementation as a shift register.

The slicer values or symbol constellation associated with the 8-VSB mode in the ATSC standard are illustrated in Table 1.

TABLE 1

Slicer values for 8-VSB.

| VSB Mode | Slicer Values |
| --- | --- |
| 8 VSB | ±32, ±96, ±160, ±224 |

Table 2 illustrates the blind power ring values associated with the 8-VSB mode in the ATSC standard, both for equations (3) and (12) and the slicer values in Table 1 above.

TABLE 2

Blind power ring values associated with Table 1

| VSB Mode | $R_2$ (equation 3) | $R_5$ (equation 12) |
|---|---|---|
| 8 VSB | 37888 decimal (9400 hex) | 31744 decimal (7C00 hex) |

The importance of the blind power ring value can be explained by observing that only when the ring is assigned the optimum value in equation (2) or (4) will the equalizer output in blind mode converge to the proper slicer values. The power ring value acts as an automatic gain control on the equalizer output. If the power ring is smaller than the optimum value the equalizer outputs will be closer together than the slicer values. If the power ring is larger than the optimum value the equalizer outputs will be further apart than the slicer values. Only when the power ring is the optimum value does the equalizer output coincide with the slicer values, as illustrated in FIG. 3.

Figure 4:
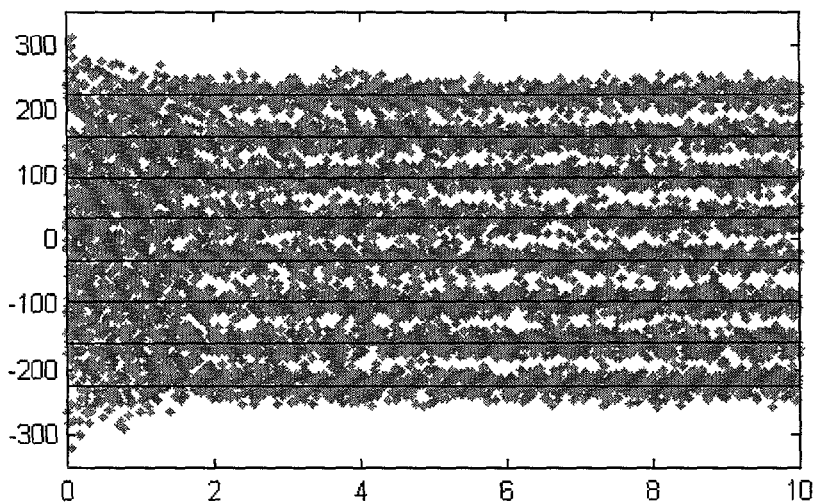
FIG. 4 illustrates equalizer and slicer outputs versus symbols on a $10^5$ scale for an algorithm according to the present invention operating in blind mode, with a signal-to-noise ratio of 20 dB.

FIG. 4 illustrates the simplified blind mode convergence in white noise. For simplification, the noise chosen for a SNR of 20 dB was additive white Gaussian noise. The added white noise worsens the convergence, translating into an increase in MSE at the equalizer output, but it does not alter the blind power ring value. That is, the equalizer outputs still coincide on average with the slicer values in Table 1.

Figure 5:
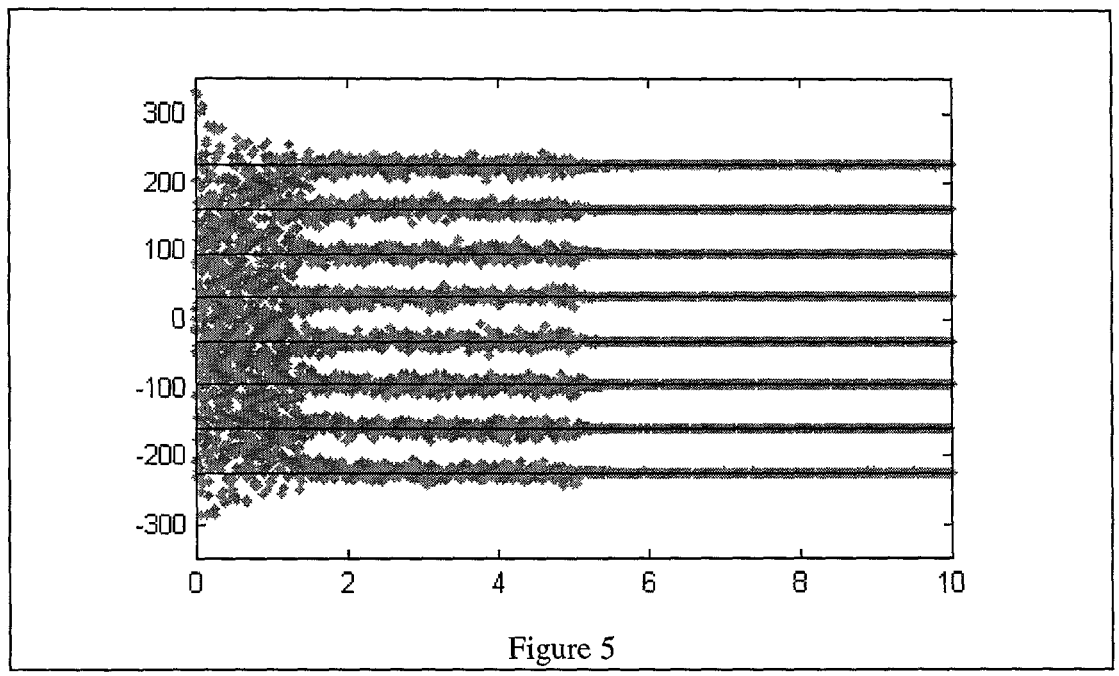
FIG. 5 illustrates equalizer and slicer outputs versus symbols on a $10^5$ scale for an algorithm according to the present invention operating in blind mode and then in decision-directed mode.
Figure 6:
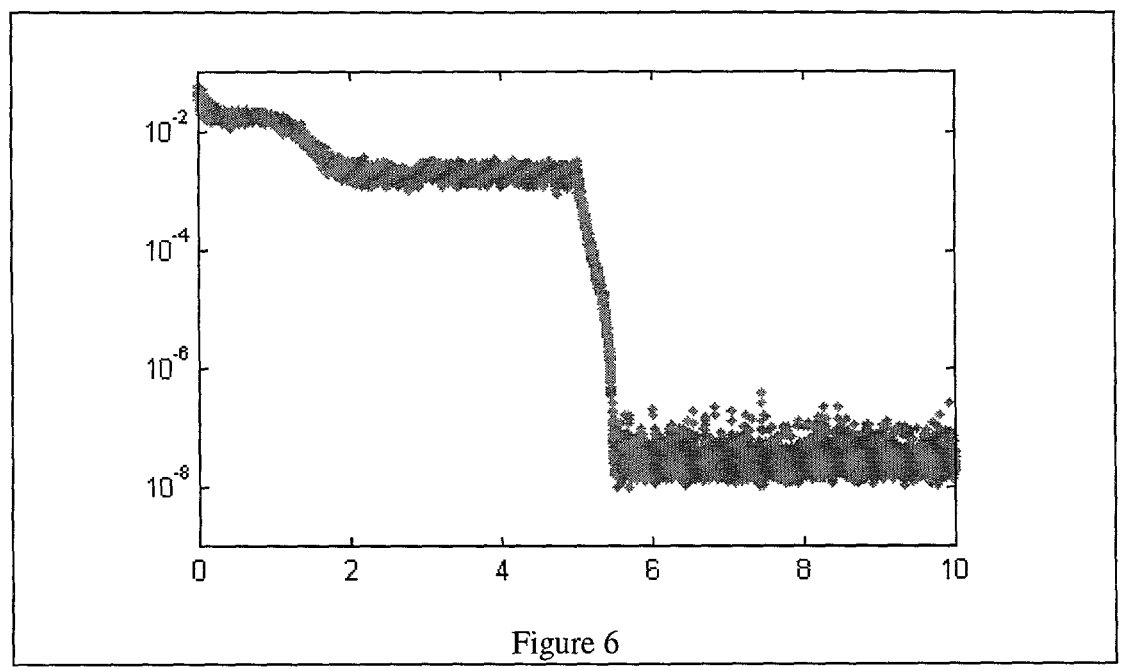
FIG. 6 illustrates equalizer output normalized MSE versus symbols on a $10^5$ scale for an algorithm according to the present invention operating in blind mode and then in decision-directed mode.

After the equalizer has converged in blind mode, it is then switched to a decision-directed mode satisfying the least mean squares algorithm, for further improvement of the MSE with respect to the slicer output. FIG. 5 illustrates the transition from the simplified blind to decision-directed mode for the case illustrated in FIG. 3. The transition to decision directed mode is performed at symbol number $5 \times 10^5$, and the step size in decision-directed mode remained the same. FIG. 6 illustrates the curve of normalized MSE versus symbols associated with FIG. 5. The MSE is normalized by the average signal power and is calculated as an average over 100 points. Note that the curve has two transitions: the first, when blind convergence is achieved, and the second sharp transition after switching to the decision-directed mode.

Figure 7:
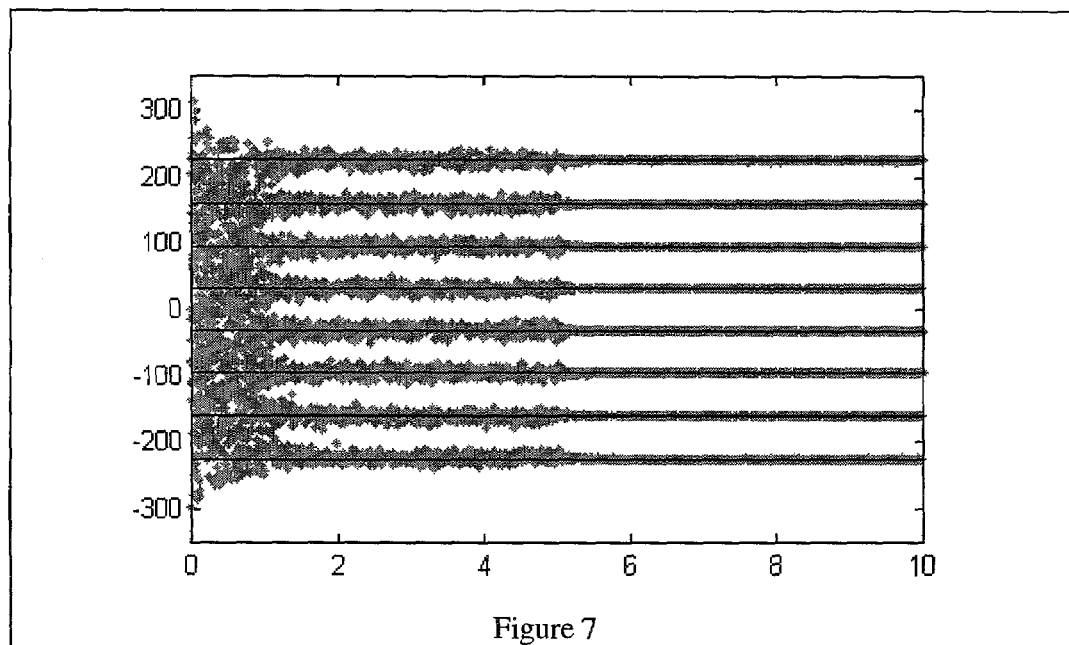
FIG. 7 illustrates equalizer and slicer outputs versus symbols on a $10^5$ scale for Godard's Constant Modulus Algorithm operating in blind mode and then in decision-directed mode; and, FIG. 8 illustrates equalizer output normalized MSE versus symbols on a $10^5$ scale for Godard's Constant Modulus Algorithm operating in blind mode and then in decision-directed mode.
Figure 8:
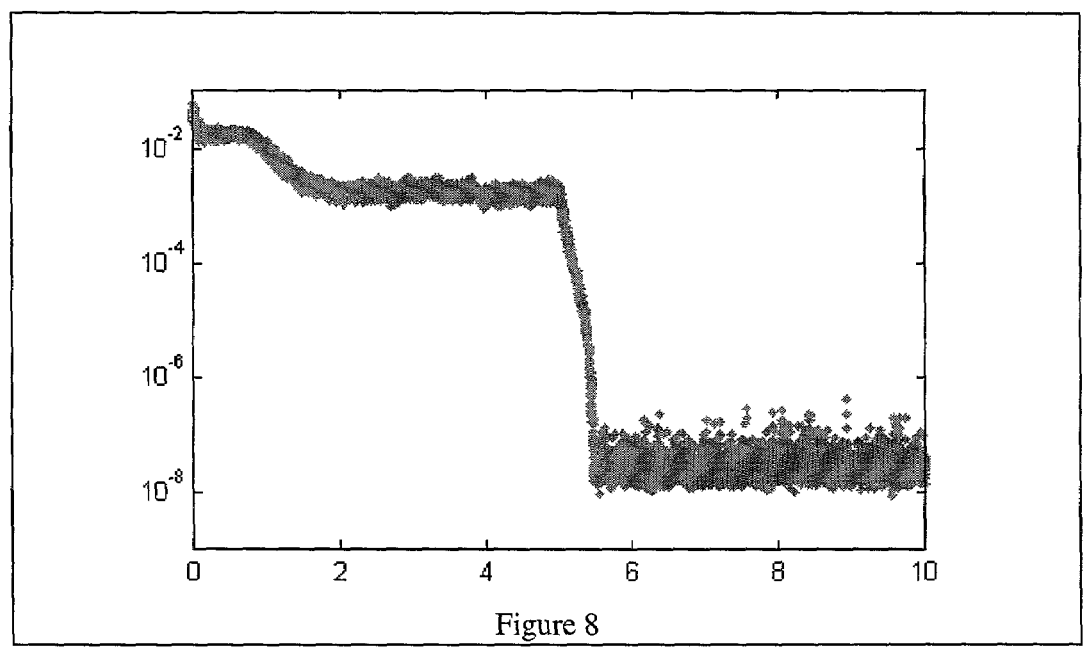

In order to compare the simplified blind algorithm with Godard's algorithm, similar curves were obtained for the blind error in equation (2). FIG. 7 illustrates the transition from Godard's blind algorithm to decision-directed mode. Because of the difference in equations (2) and (4), the algorithms react differently to the same step size. Therefore, a step size was chosen which results in a similar convergence time for Godard's algorithm, as compared to the invention simplified algorithm case in FIG. 5. The step size is $\Delta=(½)^8(b_{FF}=b_{FB}=8)$. The transition to decision-directed mode is performed at symbol number $5 \times 10^5$, and the step size in decision-directed mode remained the same as in FIG. 5, that is, $\Delta=(½)^{10}(b_{FF}=b_{FB}=10)$. FIG. 8 illustrates the curve of normalized MSE versus symbols associated with FIG. 7. Notice that FIGS. 7 and 8 illustrate substantially the same performance as FIGS. 5 and 6.

It is noted that Godard's algorithm performs slightly better as the step size is decreased. That is, Godard's algorithm converges slightly faster, and with slightly smaller MSE. This is to be expected, since the simplified algorithm presented herein removes some of the Godard algorithm's blind error dynamic range. However, as seen from the Figures, the difference in performance is not substantial, and ultimately, equalization will transition from the blind mode to the decision-directed mode, where the majority of the MSE improvement takes place. In addition, for the ATSC-HDTV system, practical SNR values are around 15 to 25 dB, meaning that the system white noise power is well above the MSE levels and ultimately dominates the equalizer performance.

The described simplified blind algorithm for the ATSC HDTV equalizer, a simplification over the blind algorithm by Godard, simplifies blind equalization, decreases its dynamic range, and implies a new blind mode ring. The new blind error requires a smaller number of bits to represent it, resulting in hardware savings in the equalizer implementation at the expense of the above-noted slightly increased MSE at the equalizer output.

What is claimed is:

1. Apparatus for processing a received synchronous data signal, comprising:
an adaptive equalizer having several tap coefficients subject to being updated, said equalizer generating an error signal derived from an equalized data symbol, said error signal being defined as $e(k)=\mathrm{sign}[z(k)]*(R_s-|z(k)|^2)$ where sign[ ] is the sign function, | | is the magnitude function, z(k) is the equalizer output at symbol time k and $R_s$ is a positive real constant; and
wherein said equalizer updates said tap coefficients in response to said error signal.

2. Apparatus according to claim 1, wherein $R_s$ is defined as $R_s=E\{|a_n|^3\}/E\{|a_n|\}$ where E { } is the mathematical expectation function and | | is the magnitude function.

3. Apparatus according to claim 1, wherein said received signal is modulated by a one-dimensional modulation technique.

4. Apparatus according to claim 1, wherein said error is generated during a blind equalization operating mode.

5. Apparatus according to claim 1, wherein said received signal is a high definition television (HDTV) signal.

6. Apparatus according to claim 1, wherein said received signal is a high definition television signal in accordance with the ATSC standard.

7. Apparatus for processing a received synchronous data signal, comprising:
an adaptive equalizer having several tap coefficients subject to being updated, said equalizer generating an error signal derived from an equalized data symbol, said error signal being defined as $e(k)=\mathrm{sign}[z(k)]*(R_{sp}-|z(k)|^p)$ where sign[ ] is the sign function, | | is the magnitude function, z(k) is the equalizer output at symbol time k, $R_{sp}$ is a positive real constant and p is a positive integer; and
wherein said equalizer updates said tap coefficients in response to said error signal.

8. Apparatus according to claim 7, wherein $R_{sp}$ is defined as $R_{sp}=E\{|a_n|^{(p+1)}\}/E\{|a_n|\}$ where E{ } is the mathematical expectation function; | | is the magnitude function and p is a positive integer.

9. Apparatus for processing a received synchronous data signal wherein data symbols are transmitted at the symbol rate 1/T, using a vestigial sideband (VSB) modulation technique, comprising:

an adaptive real (non-complex) equalizer having several tap gains or tap coefficients updated according to the equation $$c(n, k+1) = c(n,k) + (\Delta * e(k) * y(k-n))$$

$$1 \leq n \leq M$$

where $c(n, k)$ is tap coefficient number n at symbol time k; $\Delta$ is the step size; M is the equalizer filter size; $y(k-n)$ is the equalizer filter input at time $(k-n)$; $e(k)$ is the error signal at symbol time k, and symbol time k implies an actual time of k*T, where T is the symbol period and 1/T is the symbol rate, said equalizer generating said error signal derived from the equalized symbol, with the error signal being defined as $$e(k) = \text{sign}[z(k)] * (R_s - |z(k)|^2)$$

where sign[ ] is the sign function, | | is the magnitude function, $z(k)$ is the equalizer output at symbol time k and $R_s$ is a positive real constant; and wherein said equalizer updates said tap coefficients in response to said error signal.

10. Apparatus according to claim 9, wherein $R_s$ is defined as:

$$R_s = E\{|a_n|^3\}/E\{|a_n|\}$$

where E{ } is the mathematical expectation function and | | is the magnitude function.

11. Apparatus for processing a received synchronous data signal wherein data symbols are transmitted at the symbol rate 1/T, using a vestigial sideband (VSB) modulation technique, comprising:

an adaptive real (non-complex) equalizer having several tap gains or tap coefficients updated according to the equation $$c(n, k+1) = c(n,k) + (\Delta * e(k) * y(k-n))$$

$$1 \leq n \leq M$$

where $c(n, k)$ is tap coefficient number n at symbol time k; $\Delta$ is the step size; M is the equalizer filter size; $y(k-n)$ is the equalizer filter input at time $(k-n)$; $e(k)$ is the error signal at symbol time k, and symbol time k implies an actual time of k*T, where T is the symbol period and 1/T is the symbol rate, said equalizer generating a generalized form of said error signal derived from the equalized symbol, with the generalized error signal being defined as $$e(k) = \text{sign}[z(k)] * \{R_{sp} - |z(k)|^p\}$$

where sign[ ] is the sign function, | | is the magnitude function, $z(k)$ is the equalizer output at symbol time k, $R_{sp}$ is a positive real constant and p is a positive integer; and wherein said equalizer updates said tap coefficients in response to said error signal.

12. Apparatus according to claim 11, wherein $R_{sp}$ is defined as $$R_{sp} = E\{|a_n|^{(p+1)}\}/E\{|a_n|\}$$

where E{ } is the mathematical expectation function; | | is the magnitude function and p is a positive integer.

* * * * *